US006768233B2

(12) United States Patent
Angerpointner

(10) Patent No.: US 6,768,233 B2
(45) Date of Patent: Jul. 27, 2004

(54) SLIP RING UNIT WITH A PRINTED CIRCUIT BOARD

(75) Inventor: Ludwig Angerpointner, Munich (DE)

(73) Assignee: LTN Servotechnik GmbH, Otterfing (DE)

(*) Notice: Subject to any disclaimer, the term of this patent is extended or adjusted under 35 U.S.C. 154(b) by 0 days.

(21) Appl. No.: 10/043,885

(22) Filed: Jan. 9, 2002

(65) Prior Publication Data

US 2002/0130568 A1 Sep. 19, 2002

(30) Foreign Application Priority Data

Mar. 15, 2001 (DE) ........................................ 101 12 895

(51) Int. Cl.$^7$ ................................................ H02K 11/00

(52) U.S. Cl. .................................... 310/68 R; 310/323

(58) Field of Search ............................ 310/68 R, 68 A, 310/DIG. 6, 71, 232; 439/27, 26; 29/596–598

(56) References Cited

U.S. PATENT DOCUMENTS

| | | | | | |
|---|---|---|---|---|---|
| 3,042,998 | A | | 7/1962 | Swett et al. | 29/155.5 |
| 3,913,114 | A | * | 10/1975 | Taguchi et al. | 396/263 |
| 4,594,524 | A | * | 6/1986 | Sudo | 310/68 R |
| 4,617,505 | A | | 10/1986 | Sausner et al. | 318/626 |
| 4,689,023 | A | * | 8/1987 | Strong et al. | 439/189 |
| 4,812,695 | A | * | 3/1989 | Parshall | 310/258 |
| 4,818,911 | A | * | 4/1989 | Taguchi et al. | 310/259 |
| 4,870,311 | A | | 9/1989 | Chase et al. | 340/239 |
| 5,124,608 | A | * | 6/1992 | Lawrence et al. | 310/232 |
| 5,231,374 | A | * | 7/1993 | Larsen et al. | 340/540 |
| 5,357,160 | A | * | 10/1994 | Kaneda et al. | 310/67 R |
| 5,793,133 | A | * | 8/1998 | Shiraki et al. | 310/81 |
| 6,181,046 | B1 | * | 1/2001 | Daikoku et al. | 310/236 |
| 6,304,014 | B1 | * | 10/2001 | England et al. | 310/68 B |
| 6,380,648 | B1 | * | 4/2002 | Hsu | 310/67 A |
| 6,517,357 | B1 | * | 2/2003 | Athanasiou et al. | 439/26 |
| 2003/0103770 | A1 | | 6/2003 | Arbuckle | 346/427 |

FOREIGN PATENT DOCUMENTS

| | | |
|---|---|---|
| DE | 34 14 211 C2 | 5/1990 |
| DE | G 94 01 715.8 U1 | 5/1994 |
| DE | 43 16 142 A1 | 11/1994 |

* cited by examiner

*Primary Examiner*—Karl Tamai
*Assistant Examiner*—Leda Pham
(74) *Attorney, Agent, or Firm*—Brinks Hofer Gilson & Lione

(57) ABSTRACT

A device for transferring electric currents that includes a slip ring unit that has a rotor with connecting wires and a stator and a printed circuit board fastened to the rotor, wherein the printed circuit board includes connectors in electrical contact with the connecting wires, wherein a torque required for rotary movement between the rotor and the stator is introduced via the printed circuit board.

2 Claims, 3 Drawing Sheets

SLIP RING UNIT WITH A PRINTED CIRCUIT BOARD

Applicant claims, under 35 U.S.C. § 119, the benefit of priority of the filing date of Mar. 15, 2001 of a German patent application, copy attached, Serial Number 101 12 895.9, filed on the aforementioned date, the entire contents of which is incorporated herein by reference.

BACKGROUND OF THE INVENTION

1. Field of the Invention

The present invention relates to a device for transmitting electrical currents, including a slip ring unit and a printed circuit board, as well as to its employment in connection with remote-controlled objects.

2. Discussion of Related Art

Slip rings are employed in many technical fields for transmitting electrical signals or electrical power from a stationary electrical unit to a rotating electrical unit. For example, slip rings are employed for the operation of remote-controlled cameras. In this application, electrical signals must be transmitted from the pivotable camera to an electronic evaluating device, and further than that also the electrical power and signals for operating of drive mechanisms, for example for zoom regulation or an electrical drive mechanism for pivoting. In the same way, electrical slip rings are used in connection with other electrical devices, for example rotatable searchlights, laser installations or robotic components.

A slip ring structure is shown in U.S. Pat. No. 3,042,998, the entire contents of which is incorporated herein by reference. In U.S. Pat. No. 3,042,998 the wires of the slip ring rotor are conducted in grooves extending in the axial direction and whose spacing in the circumferential direction has an even graduation. Because of this guidance, the wires project out of the slip ring along the rotor circumference in an orderly manner and with even spacing. No reference is made in this document to the use of a printed circuit board.

U.S. Pat. No. 5,213,374 discloses a slip ring arrangement in which a printed circuit board has been placed inside the housing of the actual slip ring unit. This printed circuit board is essentially used for signal amplification inside the slip ring unit. The internal printed circuit board of this patent disclosure cannot transmit a torque, because an appropriate housing has been provided there for this function. Moreover, no ordered guidance in the sense of a functionally-related local assignment of the connecting wires to the printed circuit board is provided in U.S. Pat. No. 5,213,374, the entire contents of which is incorporated herein by reference.

A wireless slip ring is disclosed in U.S. Pat. No. 4,870,311, the entire contents of which is incorporated herein by reference. In U.S. Pat. No. 4,870,311 strip conductors on printed circuit boards are used in place of the wires in the slip ring unit. The printed circuit boards, all of which are located inside the slip ring unit in accordance with this patent, are connected as flexible cables, which assure the connection with external devices. A flange is provided, which is fastened on the rotating body and is used for an appropriate introduction of a torque.

The above-described known devices have the disadvantage that the torque required for the relative movement between the rotor and the stator is supplied via separate mechanical devices which must be provided in addition to the already present printed circuit boards. In particular, in connection with slip ring units which are produced in large numbers, it is necessary to achieve a material-saving construction, which moreover requires the fewest number of components.

Further details of the present invention ensue from the following description of an exemplary embodiment by the attached drawings.

OBJECT AND SUMMARY OF THE INVENTION

An object of the present invention is therefore based on making possible a slip ring unit with a printed circuit board which is distinguished by a simple and cost-effective construction.

This object is attained by a device for transferring electric currents that includes a slip ring unit that has a rotor with connecting wires and a stator and a printed circuit board fastened to the rotor, wherein the printed circuit board includes connectors in electrical contact with the connecting wires, wherein a torque required for rotary movement between the rotor and the stator is introduced via the printed circuit board.

The above-mentioned object is also attained by a device for transferring electric currents that includes a slip ring unit that has a stator with connecting wires and a rotor and a printed circuit board fastened to the stator and having connectors that are in electrical contact with the connecting wires of the stator and wherein the printed circuit board is used as a torque support.

Other aspects of the device in accordance with the present invention are intended to be used for operating remote-controlled objects.

A slip ring unit is understood to be a device including a rotor and a stator and has connecting wires, which are conducted inside the slip ring essentially in the axial direction and are respectively in electrical contact with sliding contacts at the stator and rotor. The connecting wires can be embodied either as a solid cable, or as stranded conductors including several twisted individual wires. The connecting wires are customarily surrounded by an insulating layer, which is often removed in the area of the ends of the connecting wires. The above mentioned sliding contacts (for example rings and matching spring-loaded wire elements) should be mentioned as further components of the slip ring unit, which are in sliding contact when the slip ring is in operation and transmit the electrical current. In particular, those slip ring units are addressed in what follows, in which the rotor and stator have an essentially cylindrical, or hollow-cylindrical, form.

In what follows, electrical current is understood to mean electrical signals, as well as electrical current for transmitting power, or energy.

The advantage achieved by the present invention resides in that the number of components for a slip ring unit with a printed circuit board is reduced by the novel device. The entire construction is simplified in this way, and a material-saving design of this device is made possible, so that a cost-effective technical solution is also achieved in the end. On the other hand, the outlay for assembly, or for putting together the device in accordance with the present invention, becomes comparatively small. Further than that, an extremely small structural depth of the slip ring unit with the associated mechanical connector is achieved.

The present invention is based on the concept that the printed circuit board not only transmits electrical currents, but also the torque required to be produced for the relative movement between the rotor and the stator. In this case, it is possible either to introduce the torque into the rotor by the printed circuit board, or the printed circuit board is used as a torque support at the stator in order to produce a corresponding reaction force.

Moreover, the connecting wires which are conducted out of the slip ring unit are advantageously put in order in such a way that their function is correlated with the respective connecting wire position, so that a printed circuit board with an appropriate connecting pattern can be connected simply and assuredly with the slip ring unit. Because of this, it is possible to perform the connecting process between the connecting wires and the printed circuit board completely or partially automatically.

However, the present invention also includes arrangements in which the printed circuit board is fastened on the stator, so that the rotary movement then need not necessarily be introduced into the rotor by a further printed circuit board. In this case, it is decisive for the present invention that the printed circuit board at the stator transfers the reaction force from this rotary movement quasi in the form of a torque support to a stationary device. The idea of the present invention is therefore independent of whether the printed circuit board is fastened on the rotor or the stator.

A possible exemplary embodiment of the present invention will be explained in greater detail by the drawings.

DETAILED DESCRIPTION OF THE PREFERRED EMBODIMENTS

Figure 1:
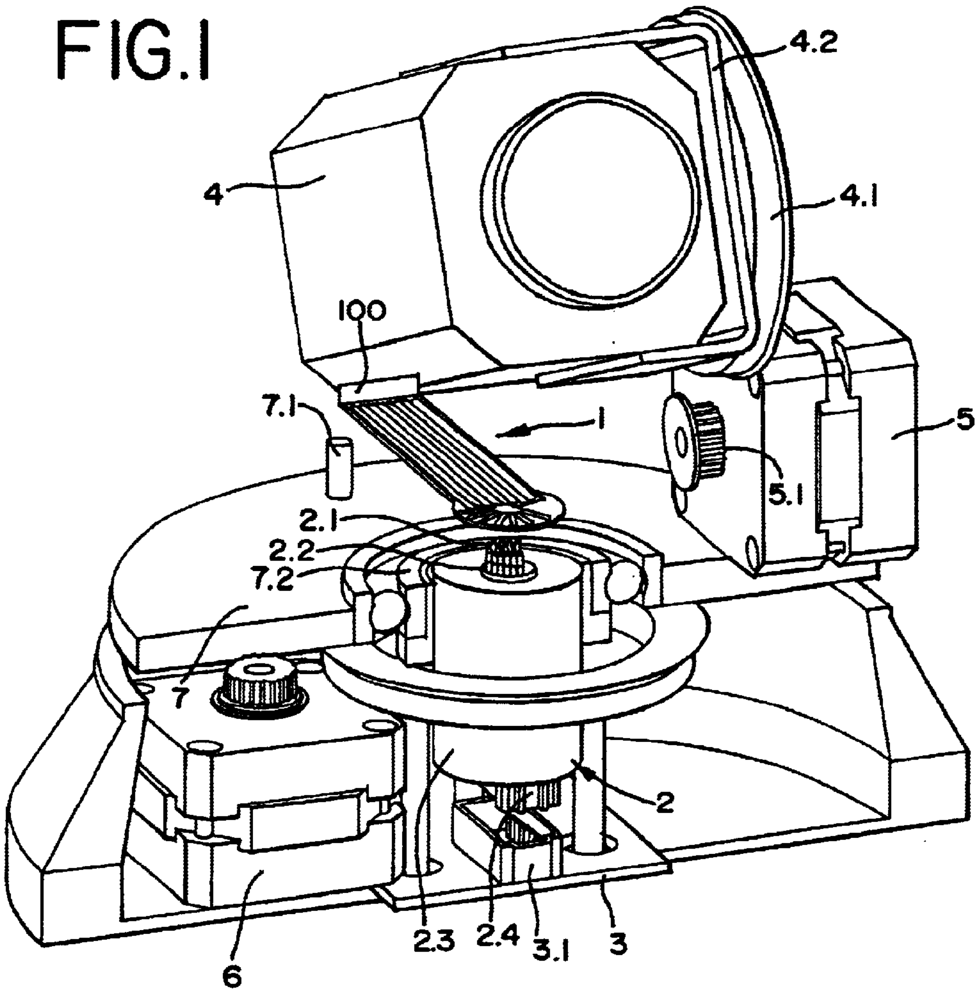
FIG. 1 is an exploded representation of an embodiment of a slip ring unit with a printed circuit board according to the present invention to be used with a stationary board as a constituent of a pivoting device for a remote-controlled camera in accordance with the present invention.

An exploded representation is shown in FIG. 1, which makes clear the application of the device in accordance with the present invention for the operation of a remote-controlled camera 4. The representation of the cable connection was omitted in this drawing figure for reasons of clarity. Also, not shown in this drawing figure is the remote operation, or the remote control of the tilt drive 5 and the pivot drive 6, as well as the camera 4.

Essentially, two electronic function groups are housed on a stationary board 3, which are required for the correct operation of a remote-controlled camera 4 (the function groups are not shown in detail in the drawing figures). The first function group includes electronic components intended for controlling the tilt drive 5 and the zoom regulation of the camera 4. The other function group receives the electronic signals containing the optical information from the camera 4, and processes them into a conventional video signal format.

The electrical currents for operating the remote-controlled camera 4 are conducted through a socket 3.1 on the stationary board 3. The slip ring unit 2 has a double-row plug 2.4, which is inserted into the socket 3.1. The plug connection between the plug 2.4 and the socket 3.1 is designed to be so solid that it is also used as a torque support during the operation of the slip ring unit 2. Further than that, no mechanical components for fastening or securing the slip ring unit 2 on the stationary board 3 are required because of the mechanical strength of the plug connection. A simple disassembly of the slip ring unit 2 from the stationary board 3 is also possible because of the use of the plug connection. The inside of the pivot bearing 7.2 is designed for this purpose in such a way that the stator 2.3 is fixed in place in the pivot bearing 7.2 by simply being plugged into it.

Starting at the plug 2.4, conducting wires run to the sliding contacts on the inside of the stator 2.3 of the slip ring unit 2. A flow of electrical current to the rotor 2.2 is made possible via these sliding contacts inside the slip ring unit 2. The sliding contacts on the rotor side are in electrical contact with connecting wires 2.1. Inside the slip ring unit 2, the connecting wires 2.1 are conducted to the outside in a manner axis-parallel to the rotor 2.2. Here, the rotor 2.2 is embodied by grooves 2.5 (in FIG. 3) in the axial direction in such a way that the connecting wires are arranged, according to their function, or according to the current to be transmitted, in a prearranged pattern. This means that with a finished mounted slip ring unit 2 each connecting wire 2.1 is assigned a defined position in accordance with its function at the circumference of the rotor 2.2. Regarding the design of the rotor 2.2, reference is made at this point also to the disclosure of U.S. Pat. No. 3,042,998, in particular to FIG. 1 of U.S. Pat. No. 3,042,998.

The connecting wires 2.1 are soldered by a stud-type contact to the connecting points 1.1 (see FIG. 2) of the printed circuit board 1. The connecting points 1.1 of the printed circuit board 1 constitute the opposite element with respect to the above mentioned arrangement of the connecting wires 2.1. The connecting points 1.1 therefore have the same pattern, i.e. the same geometric arrangement, as the ends of the connecting wires 2.1. In the first step, the assembly of the printed circuit board 1 with the slip ring unit 2 is performed only by plugging the printed circuit board 1 together with the connecting wires 2.1 in such a way that the connecting wires 2.1 are passed through the holes in the connecting points 1.1. Thus, no sorting of the connecting wires 2.1 for an appropriate assignment to the respective connecting point 1.1 need to be performed at this stage of assembly. This results in a considerable time savings during assembly, and at the same time errors because of wrong assignment are eliminated for all practical purposes.

Following the plugging of the printed circuit board 1 to the ends of the connecting wires 2.1, soldering of the connecting wires 2.1 with the connecting points 1.1 is performed in accordance with customary techniques for producing stud-type contacts.

Alternatively to this it is also possible to solder the ends of the connecting wires 2.1 to the connecting points 1.1 at the surface of the printed circuit board 1 in accordance with a Surface Mounted Device (SMD) process.

Following soldering of the connecting wires 2.1 to the connecting points 1.1 of the printed circuit board 1, an epoxy resin material is applied in the area of the soldered connection, which cures in a short time and provides increased strength to the entire connection between the rotor 2.2 and the printed circuit board 1. If the soldering itself provides sufficient force transfer and permanent stability in regard to the respective case of application, it is possible to omit the application of epoxy resin in order to simplify an assembly process and to reduce costs.

Figure 2:
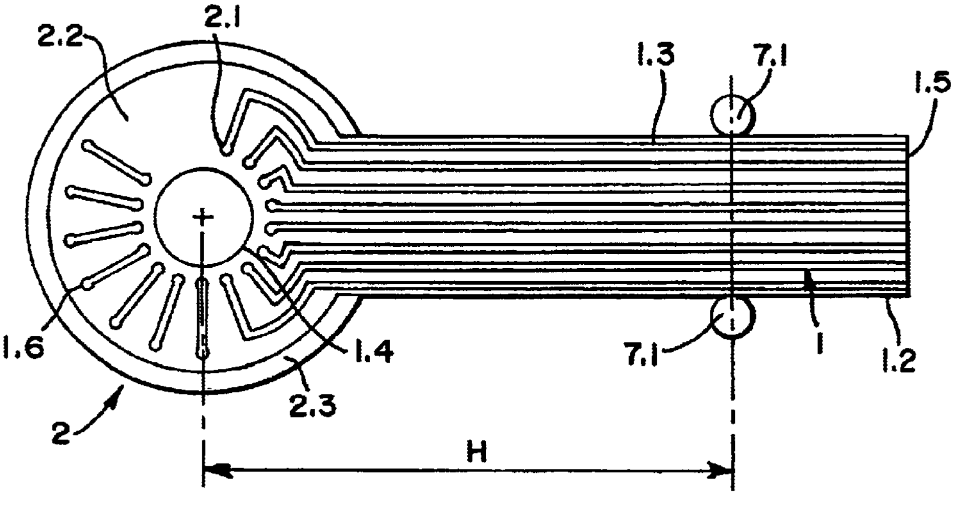
FIG. 2 is a view from above of an embodiment of the slip ring unit with a printed circuit board of FIG. 1.
Figure 3:
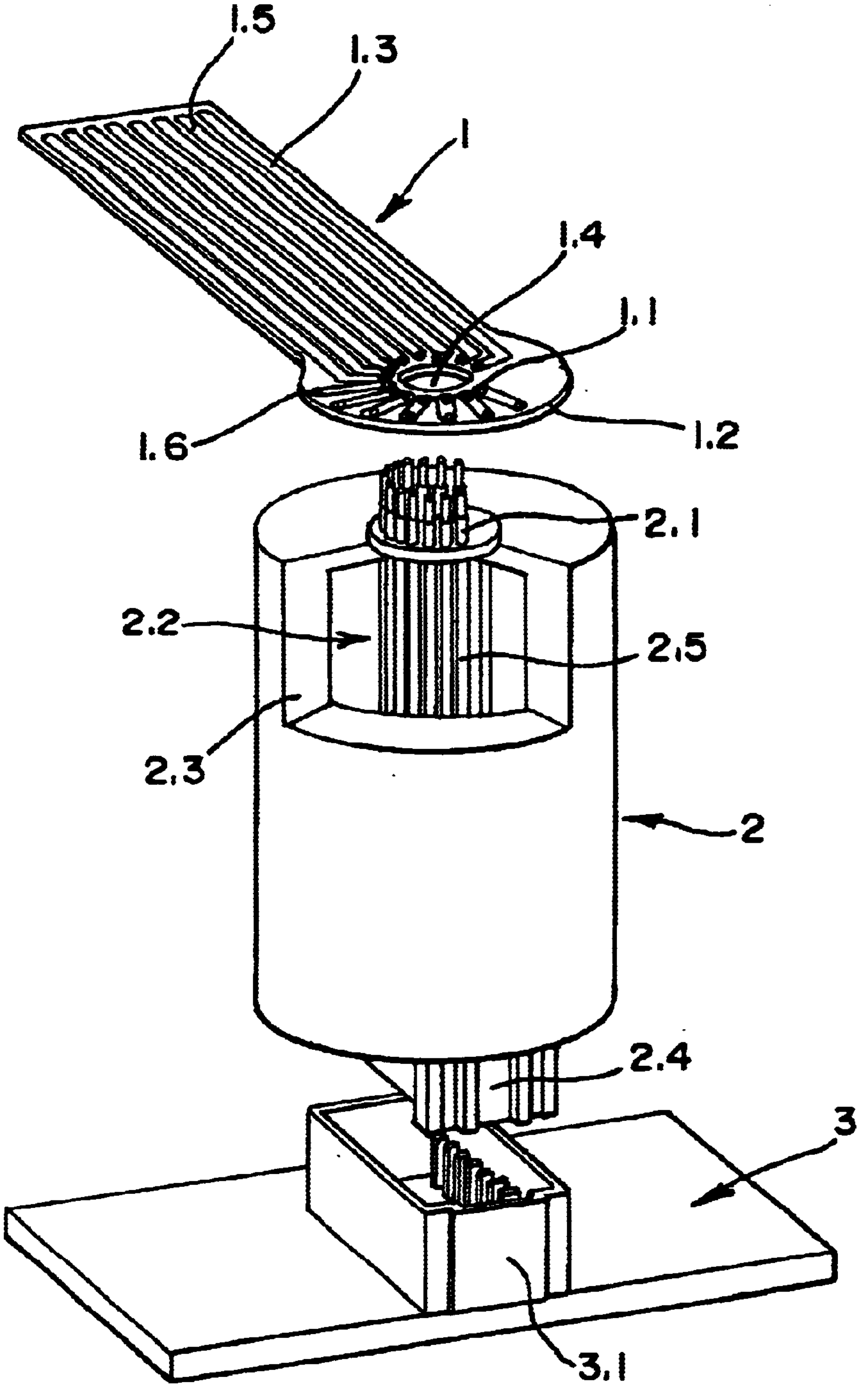
FIG. 3 is an exploded representation of the slip ring unit with a printed circuit board and a stationary board of FIG. 1.

Besides the already mentioned connecting points 1.1 to the rotor, the printed circuit board 1 includes a carrier substrate 1.2 and strip conductors 1.3 (see FIGS. 2 and 3). The material from which the carrier substrate 1.2 is made is a fiberglass-reinforced epoxy resin of the type FR4, and is therefore comparatively rigid. The strip conductors 1.3 are made of copper, which are applied to the carrier substrate 1.2 at a layer thickness of approximately 35 $\mu$m. The strip conductor ends 1.5 located opposite the connecting points 1.1 are soldered to a so-called FFC plug 100 (FFC means flexible flat cable) schematically represented by the box 100 of FIG. 1. The appropriate flat cable then constitutes a connection between the printed circuit board 1 and the camera 4. The other strip conductor ends 1.6 are electrically connected with the tilt drive 5.

Via the arrangement described above it is thus possible to transmit electrical current from the stationary plate 3 to the rotating printed circuit board 1, which in this example is in contact with the rotatable electronic camera 4. Here image signals, as well as electrical power for the tilt drive 5 of the camera 4, are transmitted via the various strip conductors 1.3.

The pivot movement of the pivot platform 7, and therefore also of the camera 4, is produced by a pivot drive 6. The tilt drive 5 is fastened on the pivot platform 7. A pulley 4.1 on the power take-off side is rotatably seated on the housing of the tilt drive 5 and is connected, fixed against relative rotation, with the camera 4 via a holder 4.2. A drive pulley 5.1 is correspondingly provided on the shaft of the tilt drive 5. For the sake of clarity, the belt for the above mentioned belt drive is not represented in FIG. 1. Moreover, two engagement pins 7.1 are located on the pivot platform 7. These engagement pins 7.1 introduce the torque required for the relative movement between the rotor 2.2 and the stator 2.3 into the slip ring unit 2. This torque is generated by the inevitable frictional action inside the slip ring unit 2, in particular between the rotor 2.2 and stator 2.3. The engagement pins 7.1 are intended to introduce the torque in connection with a change of the pivot direction with as little play as necessary into the printed circuit board 1. For this reason, these engagement pins 7.1 are made of an elastomeric material, so that the printed circuit board 1 is installed with the two engagement pins 7.1 being elastically deformed, and both engagement pins 7.1 are in contact with the printed circuit board under pre-stress.

Alternatively to this it is of course also possible to employ a different embodiment for a resilient connection for assuring a coupling free of play, for example the use of one or several leaf springs.

The above described torque introduction permits a relative movement between the printed circuit board 1 and the engagement pins 7.1 in the radial direction. In this way it is possible to compensate production-related eccentricities between the pivot platform 7 and the slip ring unit 2.

A view from above on the printed circuit plate 1 and the slip ring unit 2 is represented in FIG. 2. A representation of the stationary board 3 is omitted in FIG. 2. In this drawing figure it is possible to see how the ends of the connecting wires 2.1 are arranged on the circumference of an imaginary circle. The connecting points 1.1 are positioned on the printed circuit board 1 in a corresponding manner. Because the ends of the connecting wires 2.1 are not lined up along the entire circumference, but only in an area of approximately 270, it is impossible to plug the printed circuit board with the strip conductor 1.3 on its top in a wrong way into the connecting wires 2.1.

In case the printed circuit board 1 is connected with the slip ring unit 2 by an SMD contacting process, pins or guides are provided, which assure an exact placement of the printed circuit board 1 on the ends of the connecting wires 2.1 without extensive adjustment steps.

Alternatively to the connection of the printed circuit board 1 with the slip ring unit 2 by a soldered connection with an optional epoxy resin coating, a frictional or interlocking connection between the rotor 2.2 and the printed circuit board 1 can also be achieved by the rotor 2.2 itself. In this case, the plastic body of the rotor 2.2 should be designed, in particular for an interlocked connection, in such a way that its end (same as the connecting wires 2.1) projects out of the slip ring unit 2 and forms, together with a suitably shaped perforation 1.4 of the printed circuit board 1, an interlocking connection with the plastic body 2.2. For this variation the perforation 1.4 should, differing from the drawing figures, not have a circular shape, so that via an appropriate matching cross section of the plastic body of the rotor 2.2, a connection, fixed against relative rotation, between the rotor 2.2 and the stator 2.3 is made. This connection is preferably made in such a way that no wrong insertion of the printed circuit board 1 in the rotor 2.2 is possible, if the surface of the printed circuit board 1 is observed. Suitable connecting elements for this purpose can be feather key or slit connections, which are produced with as little play as possible. It might be possible to omit the above mentioned coating process with epoxy resin if a suitable interlocked or frictional torque transfer is assured.

The introduced torque is determined from the product of the sum of the active forces and the lever arm H. The forces, which are tangentially directed with respect to the rotary movement, are introduced by the engagement pins 7.1. Accordingly, the lever arm H is equal to the distance between the force introduction point, i.e. the contact point of the engagement pins 7.1 with the printed circuit board 1, and the fulcrum, corresponding to the shaft of the rotor 2.2 in FIG. 2.

Starting at the connecting points 1.1, the strip conductors 1.3 are initially guided in the radial direction, so that they do not fall below the minimum distance between each other.

It is obvious that it is not absolutely necessary to arrange only strip conductors 1.3 on the printed circuit board 1. Instead, the printed circuit board 1 can also be equipped with electronic components or conductors, so that the surface of the printed circuit board 1 can be well utilized in this way, which contributes to a further reduction in size of the entire system in which the slip ring unit 2 is integrated.

A printed circuit board 1, an associated slip ring unit 2 and a stationary board 3 are shown in the provided relative position with respect to each other with the aid of an exploded view in FIG. 3. An opening has been drawn in the representation of the slip ring arrangement 2 for making the guidance of the connecting wires 2.1 clear. In accordance with this, the connecting wires 2.1 are located in grooves 2.5, which extend in the surface of the plastic body of the rotor 2.2 axis-parallel with the slip ring arrangement 2, or with the rotor 2.2. As already mentioned above, reference is made in this connection to the disclosure of U.S. Pat. No. 3,042,998.

Figure 4:
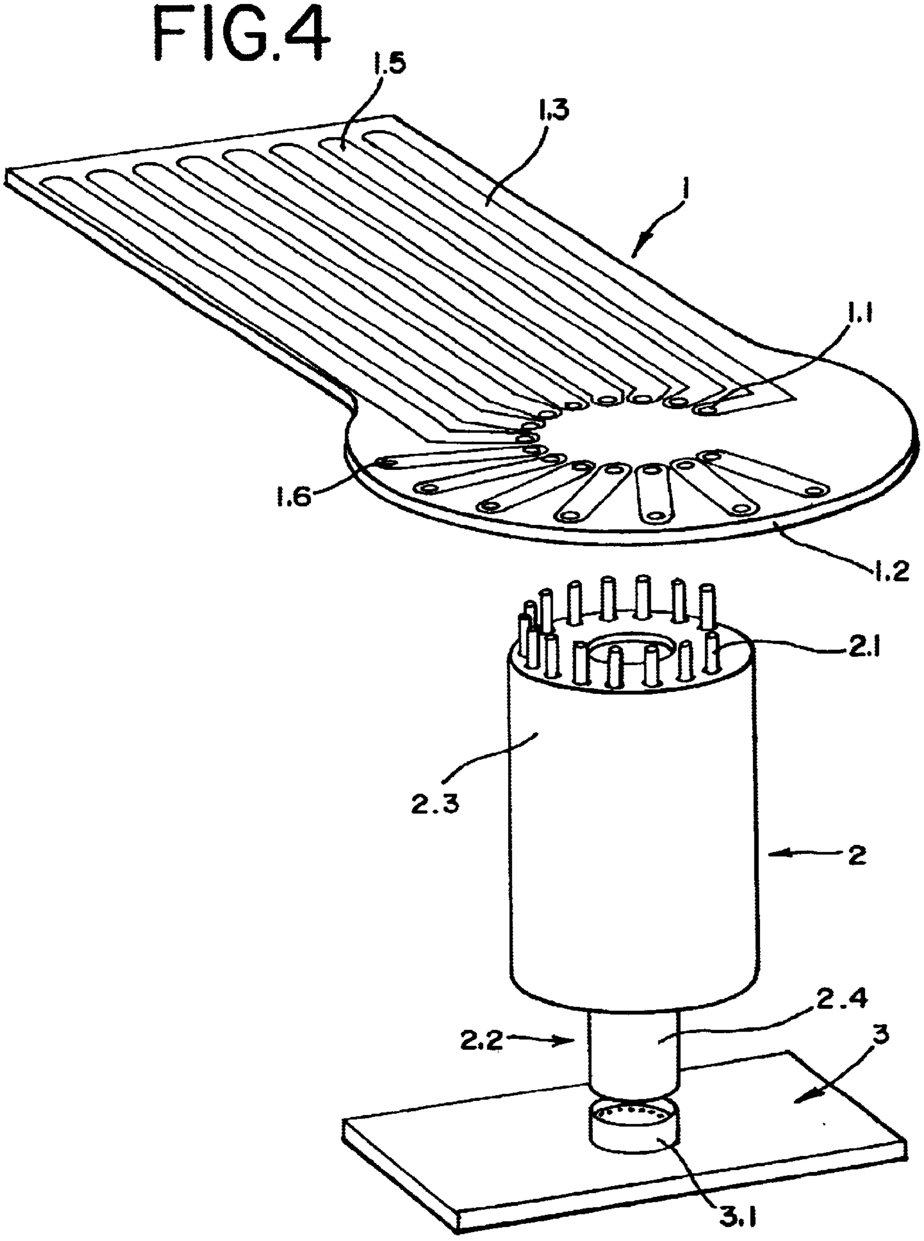
FIG. 4 is an exploded representation of a second embodiment of a slip ring unit with a printed circuit board and a stationary board in accordance with the present invention.

In another embodiment of the present invention, as shown in FIG. 4 and wherein like elements are represented by like numerals, the connecting wires 2.1 are fixed in the stator 2.3. Such a device can be adapted for use with a remote controlled object, such as the remote controlled camera 4 of FIG. 1 in a manner similar to that described previously with respect to the slip ring unit 2 of FIGS. 2 and 3. These connecting wires are conducted out of the stator 203 in accordance with a geometrically determined pattern similar to that shown in FIGS. 2 and 3 so that the printed circuit board 1 can only be attached in a desired position. These connecting wires are soldered by a stud-type contact to the connecting points 1.1 of the printed circuit board 1. The connecting points 1.1 are arranged in a pattern that is in accordance with the geometrically determined pattern of the connecting wires. In this way, the printed circuit board is stationary as well.

As shown in FIG. 4, the rotor 2.2 of the slip ring unit has a plug 2.4 at one end. The plug 2.4 is inserted into a socket 3.1, which is fixed on the rotating board 3. When the plug 2.4 and the socket 3.1 are connected with each other they are fixed against rotation relative to one another.

With the arrangement shown in FIG. 4, the board 3 transmits its rotational movement to the rotor 2.2. Within the slip ring unit 2, the electrical current is transferred from the rotor 2.2 to the stator 2.3, which is connected to the stationary printed circuit board 1. Of course, the printed circuit board 1 needs a torque support, which is not shown in FIG. 4. The torque support can be embodied as stationary pins arranged at both sides of the printed circuit board 1. The foregoing description is provided to illustrate the invention, and is not to be construed as a limitation. Numerous additions, substitutions and other changes can be made to the invention without departing from its scope as set forth in the appended claims.

I claim:

1. A device for transferring electric currents to, or from a remote-controlled camera, comprising:

a slip ring unit comprising a rotor with connecting wires and a stator, which has a substantially hollow-cylindrical form; and a printed circuit board fastened to said rotor, said printed circuit board comprising:

a flexible flat cable plug;

strip conductors having a first end and a second end, wherein said first end is in electrical contact with said connecting wires of said rotor and said second end is in electrical contact with said flexible flat cable plug; and connecting points;

wherein a torque required for rotary movement between said rotor and said stator is introduced from at least one engagement pin via said printed circuit board, wherein an outer portion of said slip ring unit is used as said stator and an inner portion of said slip ring unit is used as said rotor, and several ones of said connecting wires are conducted out of said rotor in accordance with a geometrically determined pattern, and said connecting points with said connecting wires on said printed circuit board are arranged in a pattern that is in accordance with said geometrically determined pattern, wherein said geometrically determined pattern of said connecting wires is designed in such a way that said printed circuit board can only be attached in a predetermined position.

2. A remote-controlled camera system, comprising:

a camera;

a stationary board comprising a socket;

a pivot platform comprising at least one engagement pin;

a slip ring unit comprising:

a rotor with connecting wires which are conducted inside said slip ring unit;

a stator, which has a substantially hollow-cylindrical form and has a plug which is inserted into said socket;

a printed circuit board fastened to said rotor, said printed circuit board comprising:

a flexible flat cable plug;

strip conductors having a first end and a second end, wherein said first end is in electrical contact with said connecting wires of said rotor and said second end is in electrical contact with said flexible flat cable plug; and connecting points;

wherein, starting at said connecting points, one or several of said strip conductors over at least a partial area of said printed circuit board are directed radially away from an axis of rotation of said slip ring unit;

wherein a torque required for rotary movement between said rotor and said stator is introduced from at least one engagement pin via said printed circuit board, and several ones of said connecting wires are conducted out of said rotor in accordance with a geometrically determined pattern, and said connecting points with said connecting wires on said printed circuit board are arranged in a pattern that is in accordance with said geometrically determined pattern.

* * * * *